(12) United States Patent
Hardy (10) Patent No.: US 8,572,192 B2
(45) Date of Patent: Oct. 29, 2013

(54) PRIVATE MESSAGING A SECOND RECIPIENT OF AN ELECTRONIC COMMUNICATION

(75) Inventor: Daniel Hardy, Phoenix, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 292 days.

(21) Appl. No.: 12/880,416

(22) Filed: Sep. 13, 2010

(65) Prior Publication Data

US 2012/0066314 A1     Mar. 15, 2012

(51) Int. Cl.
    *G06F 15/16*     (2006.01)

(52) U.S. Cl.
    USPC .......................................... 709/206; 709/236

(58) Field of Classification Search
    USPC ................................................ 709/206, 236
    See application file for complete search history.

(56) References Cited

U.S. PATENT DOCUMENTS

| | | | | |
|---|---|---|---|---|
| 7,293,171 | B2* | 11/2007 | Batthish et al. | 713/152 |
| 7,548,952 | B2 | 6/2009 | Delia et al. | |
| 2005/0108351 | A1* | 5/2005 | Naick et al. | 709/207 |
| 2005/0160292 | A1* | 7/2005 | Batthish et al. | 713/201 |
| 2006/0212522 | A1* | 9/2006 | Walter et al. | 709/206 |
| 2007/0156732 | A1* | 7/2007 | Surendran et al. | 707/101 |
| 2010/0017481 | A1* | 1/2010 | Chen et al. | 709/206 |
| 2010/0070592 | A1 | 3/2010 | Steuer et al. | |

OTHER PUBLICATIONS

Unpublished U.S. Appl. No. 12/768,675.
Unpublished U.S. Appl. No. 12/768,681.
Unpublished U.S. Appl. No. 12/768,688.
Unpublished U.S. Appl. No. 12/796,597.
Unpublished U.S. Appl. No. 12/823,615.

* cited by examiner

*Primary Examiner* — Tauqir Hussain
*Assistant Examiner* — Ebrahim Golabbakhsh
(74) *Attorney, Agent, or Firm* — Karl A. Fazio; Stewart J. Womack (57) ABSTRACT

Methods of the present inventions allow for private messaging a second recipient of an electronic communication. An exemplary method may comprise the steps of receiving a request to compose an electronic communication from a sender; generating a first electronic communication comprising a first recipient field, a second recipient field, and a first message field; receiving (from the sender) a first recipient electronic address in the first recipient field, a second recipient electronic address in the second recipient field, and a first message in the first message field; and prompting the sender for a private message for transmission only to the second recipient electronic address. Responsive to a negative response from the sender to the prompting step, the method may further comprise transmitting a completed version of the first electronic communication to both the first recipient electronic address and the second recipient electronic address. Responsive to a positive response from the sender to the prompting step, the method may further comprise generating a second electronic communication comprising the first recipient field, the second recipient field, the first message field, and a private message field; receiving (from the sender) a private message in the private message field; transmitting a completed version of the first electronic communication to the first recipient electronic address; and transmitting a completed version of the second electronic communication to the second recipient electronic address.

15 Claims, 13 Drawing Sheets

PRIVATE MESSAGING A SECOND RECIPIENT OF AN ELECTRONIC COMMUNICATION

FIELD OF THE INVENTION

The present inventions generally relate to electronic communications and, more particularly, systems, methods, and tools enabling private messaging a second recipient of an electronic communication.

SUMMARY OF THE INVENTION

An example embodiment of a method of private messaging a second recipient of an electronic communication may comprise receiving a request to compose an electronic communication from a sender; generating a first electronic communication comprising a first recipient field, a second recipient field, and a first message field; receiving (from the sender) a first recipient electronic address in the first recipient field, a second recipient electronic address in the second recipient field, and a first message in the first message field; and prompting the sender for a private message for transmission only to the second recipient electronic address. Responsive to a negative response from the sender to the prompting step, the method further may comprise transmitting a completed version of the first electronic communication to both the first recipient electronic address and the second recipient electronic address. Responsive to a positive response from the sender to the prompting step, the method further may comprise generating a second electronic communication comprising the first recipient field, the second recipient field, the first message field, and a private message field; receiving (from the sender) a private message in the private message field; transmitting a completed version of the first electronic communication to the first recipient electronic address; and transmitting a completed version of the second electronic communication to the second recipient electronic address.

The above features and advantages of the present inventions will be better understood from the following detailed description taken in conjunction with the accompanying drawings.

DETAILED DESCRIPTION

The present inventions will now be discussed in detail with regard to the attached drawing figures which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Prevalent on the Web are numerous websites, some of which may offer and sell goods and services to individuals and organizations. Websites may consist of a single webpage, but typically consist of multiple interconnected and related webpages. Websites, unless extremely large and complex or have unusual traffic demands, typically reside on a single server and are prepared and maintained by a single individual or entity. Menus and links may be used to move between different webpages within the website or to move to a different website as is known in the art. The interconnectivity of webpages enabled by the Internet can make it difficult for Internet users to tell where one website ends and another begins.

Such websites may be created using HyperText Markup Language (HTML) to generate a standard set of tags that define how the webpages for the website are to be displayed. Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other webpages at the same website or move to an entirely different website using the browser.

Users of computer networks, such as the Internet, routinely send electronic communications to each other. Electronic communications may contain, for example, text, images, links, and attachments. Electronic mail or email is one of the most widely used methods of communication over the Internet due to the variety of data that may be transmitted, the large number of available recipients, speed, low cost and convenience.

Email messages may be sent, for example, between friends, family members or between coworkers thereby substituting for traditional letters and office correspondences in many cases. This is possible because the Internet has few restrictions on who may send emails, the number of emails that may be transmitted and who may receive the emails. The only real hurdle for sending emails is the requirement that the sender must know the email address of the intended recipient.

Email messages travel across the Internet, typically passing from server to server, at amazing speeds achievable only by electronic data. The Internet provides the ability to send an email anywhere in the world, often in less than a few seconds. Delivery times are continually being reduced as the Internet's ability to transfer electronic data improves.

Most Internet users find email to be more convenient than traditional mail. Traditional mail requires stamps and envelopes to be purchased and a supply maintained, while emails do not require the costs and burden of maintaining a supply of associated products. Emails may also be sent with the click of a few buttons, while letters typically need to be transported to a physical location, such as a mail box, before being sent.

Once a computer and a network connection have been obtained, there are typically few additional costs associated with sending email. This remains true even if millions, or more, of emails are sent by the same user. Email thus has the extraordinary power of allowing a single user to send one or more messages to a very large number of people at an extremely low cost.

Electronic communications, such as email, are commonly used to send messages to multiple recipients. A sender may place addresses in "To:" and "CC:" (carbon copy) fields of the email message. All "To:" and "CC:" recipients will receive the message and will see the other "To:" and "CC:" recipients. If a sender places email addresses in the "BCC:" (blind carbon copy) field, the "To:" and "CC:" recipients would not know that email message was also blindly copied to "BCC:" recipients. Although the "BCC:" recipient may receive a copy of the email sent to the "To:" and "CC:" recipients, he may not understand the context for such messages.

Applicant has determined that presently-existing electronic communication systems and methods do not provide optimal means for transmitting electronic communications wherein a second recipient (e.g., a "BCC:" or "CC:" email recipient) receives an additional private message not received by the first recipient (e.g., the "To:" email recipient). The systems and methods described below solve the above-described problem by allowing a sender to transmit a private message, perhaps one that comments on the primary message or places it in context, to a second recipient, such as a "BCC:" or "CC:" email recipient. For these reasons, there is a need for the systems, methods, and tools enabling private messaging a second recipient of an electronic communication described herein.

Figure 1:
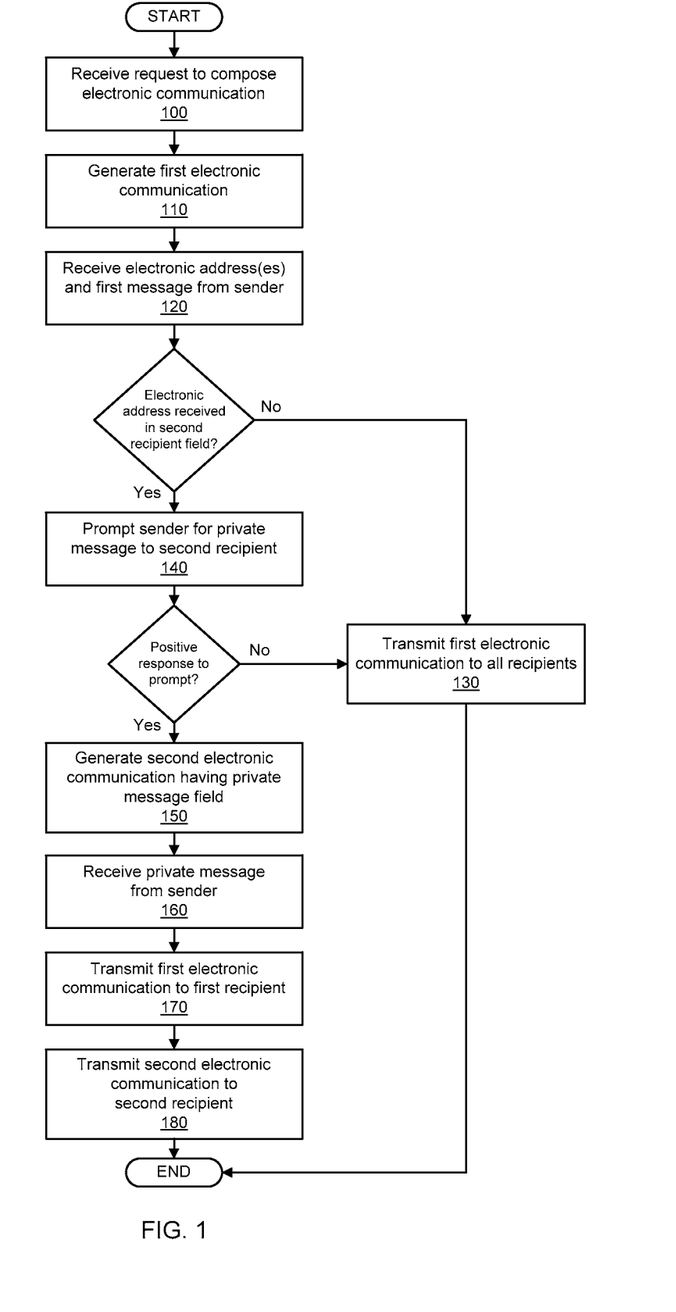
FIG. 1 is a flow diagram illustrating a possible embodiment of a method of private messaging a second recipient of an electronic communication.

FIG. 1 illustrates an example embodiment of a method of private messaging a second recipient of an electronic communication that may comprise receiving a request to compose an electronic communication from a sender (Step 100); generating a first electronic communication comprising a first recipient field, a second recipient field, and a first message field (Step 110); receiving (perhaps from the sender) a first recipient electronic address in the first recipient field, a second recipient electronic address in the second recipient field, and a first message in the first message field (Step 120); and, perhaps upon receiving the second recipient electronic address in the second recipient field, prompting the sender for a private message for transmission only to the second recipient electronic address (Step 140).

If a negative response to the prompting step (Step 140) is received from the sender, the method of FIG. 1 further may comprise transmitting a completed version of the first electronic communication to both the first recipient electronic address and the second recipient electronic address (Step 130).

Responsive to a positive response from the sender to the prompting step (Step 140), the method further may comprise generating a second electronic communication comprising the first recipient field, the second recipient field, the first message field, and a private message field (Step 150); receiving (from the sender) a private message in the private message field (Step 160); transmitting a completed version of the first electronic communication to the first recipient electronic address (Step 170); and transmitting a completed version of the second electronic communication to the second recipient electronic address (Step 180).

Figure 1A:
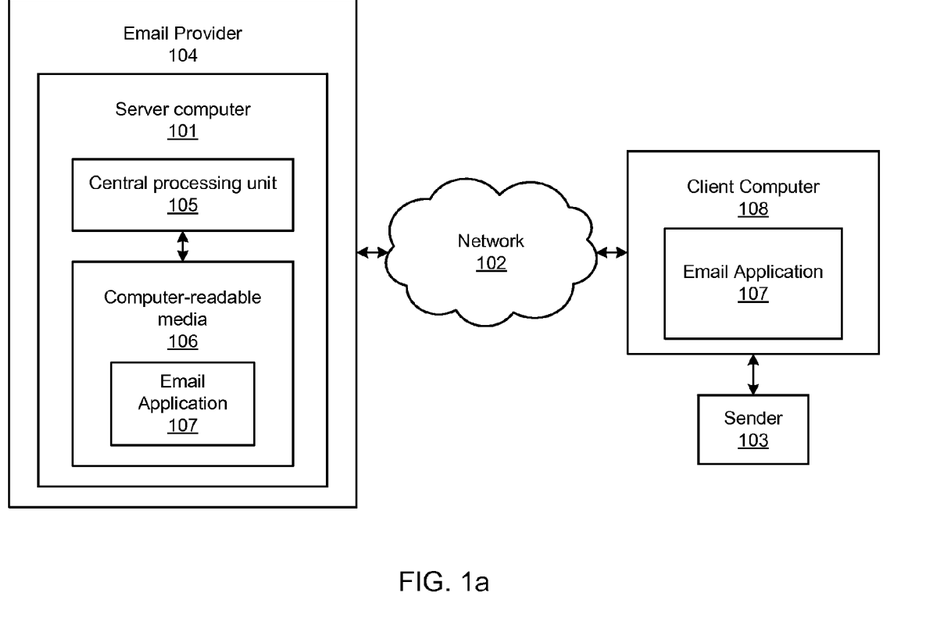
FIG. 1a illustrates a system that may perform the illustrated methods.

As a non-limiting example, each step of the method illustrated in FIG. 1 (and all other methods described herein) may be performed by a system such as illustrated in FIG. 1*a*. The illustrated exemplary system may include a central processing unit (CPU) 105 running on at least one server computer 101 communicatively coupled to a network 102 (e.g., the Internet). The CPU 105 may execute instructions stored, perhaps as scripts and/or software (e.g., an email application 107) in computer-readable media 106 accessible to the CPU 105, such as a hard disk drive or other memory on one or more server computers 101. As illustrated in FIG. 1*a*, the email application 107 may comprise a web-based (e.g., GODADDY EMAIL OR GOOGLE GMAIL) or a desktop client (e.g., MICROSOFT OUTLOOK) email application offered by an email provider 104. Accordingly, each method step described herein may be performed by a CPU 105 executing such software-based instructions.

A sender 103 may use the described systems and methods, perhaps by accessing an email application 107 via a client computer 108 communicatively coupled to the network 102. FIG. 1*a* illustrates a single-server system. However, the methods described herein also may be implemented via a multi-server or cloud computing implementation, perhaps with portions of the scripts or software implementing each individual step running on each server 101.

The example embodiments herein place no limitation on network 102 configuration or connectivity. Thus, as non-limiting examples, the network 102 could comprise the Internet, the public switched telephone network, the global Telex network, computer networks (e.g., an intranet, an extranet, a local-area network, or a wide-area network), wired networks, wireless networks, or any combination thereof.

Servers 101 may be communicatively coupled to the network 102 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

As non-limiting examples, the servers 101 could be application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, or any combination thereof).

Clients 108 that may be used to connect to the network 108 to use the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture.

Returning to FIG. 1, a server 101, perhaps via scripts and/or software running on it, may receive (perhaps from a sender 103) a request to compose an electronic communication (Step 100) by any method known in the art or developed in the future of receiving such a request. As a non-limiting example, the server computer 101 may receive a Hyper Text Transfer Protocol (HTTP) request generated when a sender 103 clicks on a "compose email" or substantially similar button in an email application 107. Alternatively, the request may be received as any communication transmitting a request to compose any electronic communication, perhaps via an electronic communication received at a server 101 including, but not limited to, electronic requests such as a File Transfer Protocol (FTP) transmission, an email message, and/or a Short Message Service (SMS) message (i.e., text message), Multimedia Messaging Service (MMS) message, or other instant message.

The sender 103 may comprise any individual, entity, process, system, or other thing sending an electronic message including, but not limited to, a person, a business, a governmental institution, an educational institution, a non-profit organization, a social organization, or a hardware and/or software system.

The electronic communication may comprise any wired, wireless, analog, or digital, message communicated by means of transmitted signals from a sender 103 to a receiver including, but not limited to, email, SMS, or MMS messages. As a non-limiting example, the electronic communication may comprise an email message generated via an email application 107.

Figure 2:
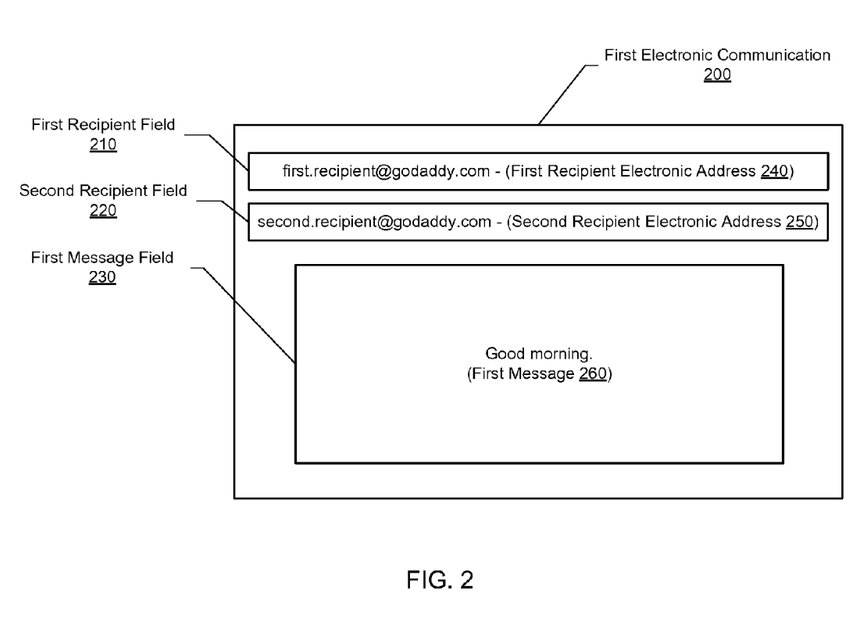
FIG. 2 illustrates a possible embodiment of an electronic communication.

After a request is received (Step 100), a first electronic communication 200 may be generated (Step 110). As illustrated in FIG. 2, the first electronic communication 200 may comprise a first recipient field 210, a second recipient field 220, and a first message field 230. As a non-limiting example, Step 110 (and all generating steps described herein) may be accomplished by scripts and/or software running on at least one server 101 (perhaps the email application 107) generating a HTML or eXtensible Markup Language (XML) file that, when transmitted to and received by the sender's 103 browser on the client computer 108, renders the generated feature, here an email message template having a "To:" field, a "BCC:" field (first recipient field 210 and second recipient field 220), and a first message field 230.

A first recipient electronic address 240, a second recipient electronic address 250, and a first message 260 then may be received, perhaps by the server 101, in the first recipient field 210, second recipient field 220, and first message fields 260, respectively (Step 120). As a non-limiting example, the described data may be entered into the respective fields on the first electronic communication 200 by the sender 103 typing the addresses and messages on his client computer 108. As a non-limiting example, the data may then be received (Step 120) at the server 101 via an HTTP transmission from the client computer's 108 browser. Where the first electronic communication 200 comprises an email message, the first recipient electronic address 240 and the second recipient electronic address 250 may both comprise email addresses entered in the "To:" and "BCC:" fields of an email message template. FIG. 2 illustrates such an email embodiment wherein the first recipient electronic address 240 and the second recipient electronic address 250 each comprise an email address (i.e., first.recipient@godaddy.com and second.recipient@godaddy.com).

If the sender 103 does not enter second recipient electronic address 250 in the second recipient field 220 (e.g., a "BCC:" email address), a completed version of the first electronic communication 200 (e.g., including the first message 260 entered by the sender 103) may be transmitted to one or more entered electronic addresses (e.g., first recipient electronic address 240 and/or "To:" or "CC:" email addresses) (Step 130). The electronic message may be transmitted by any system or method known in the art or developed in the future for transmitting electronic messages including, but not limited to sending a message via HTTP, FTP, email, SMS, MMS, or any other electronic messaging protocol.

Figure 2A:
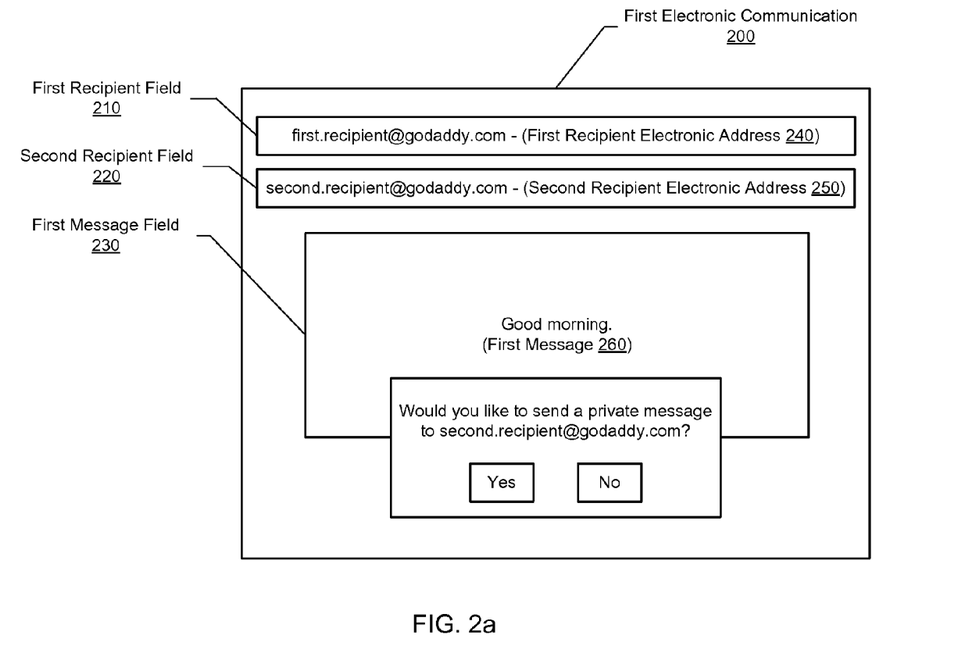
FIG. 2a illustrates a possible embodiment of an electronic communication having a prompt for determining whether a sender intends to send a private message.
Figure 3:
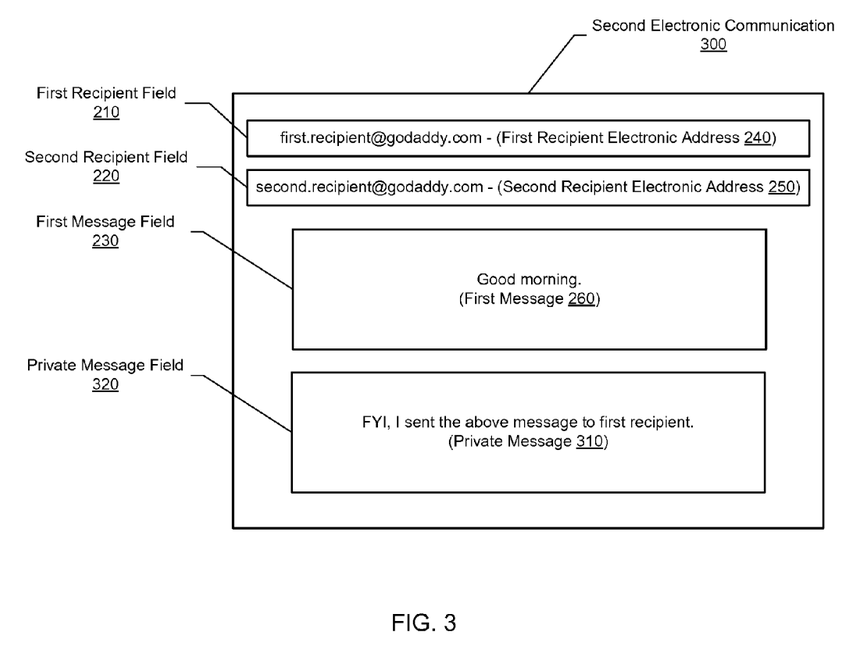
FIG. 3 illustrates a possible embodiment of an electronic communication having a private message field.
Figure 4:
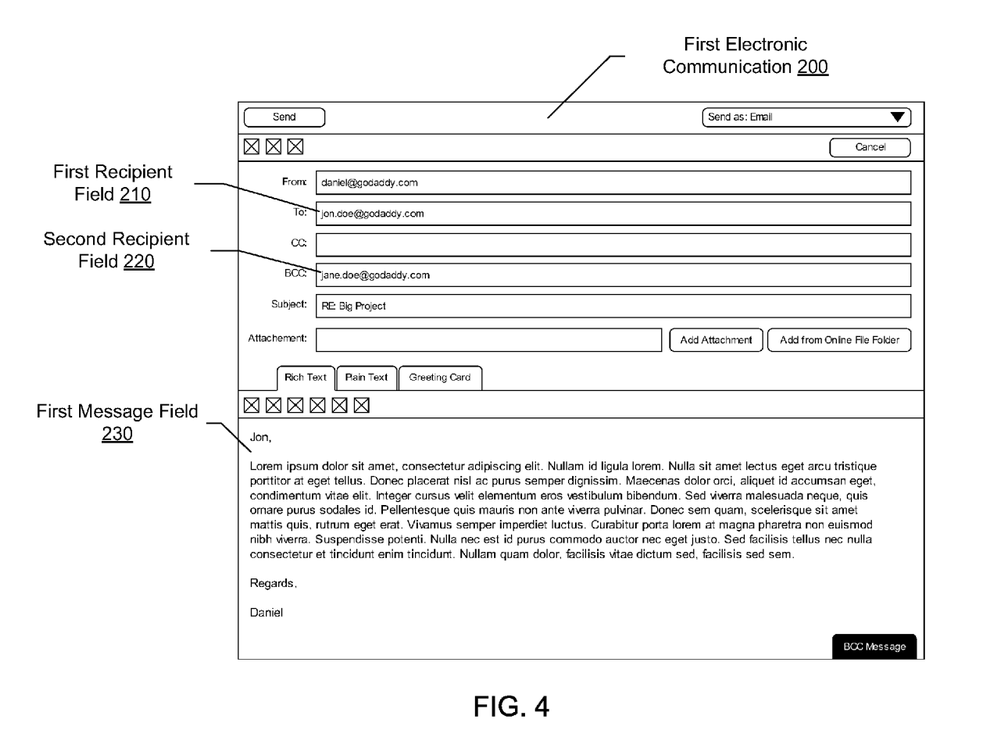
FIG. 4 illustrates a possible embodiment of an electronic communication having a tab for a private message field.
Figure 5:
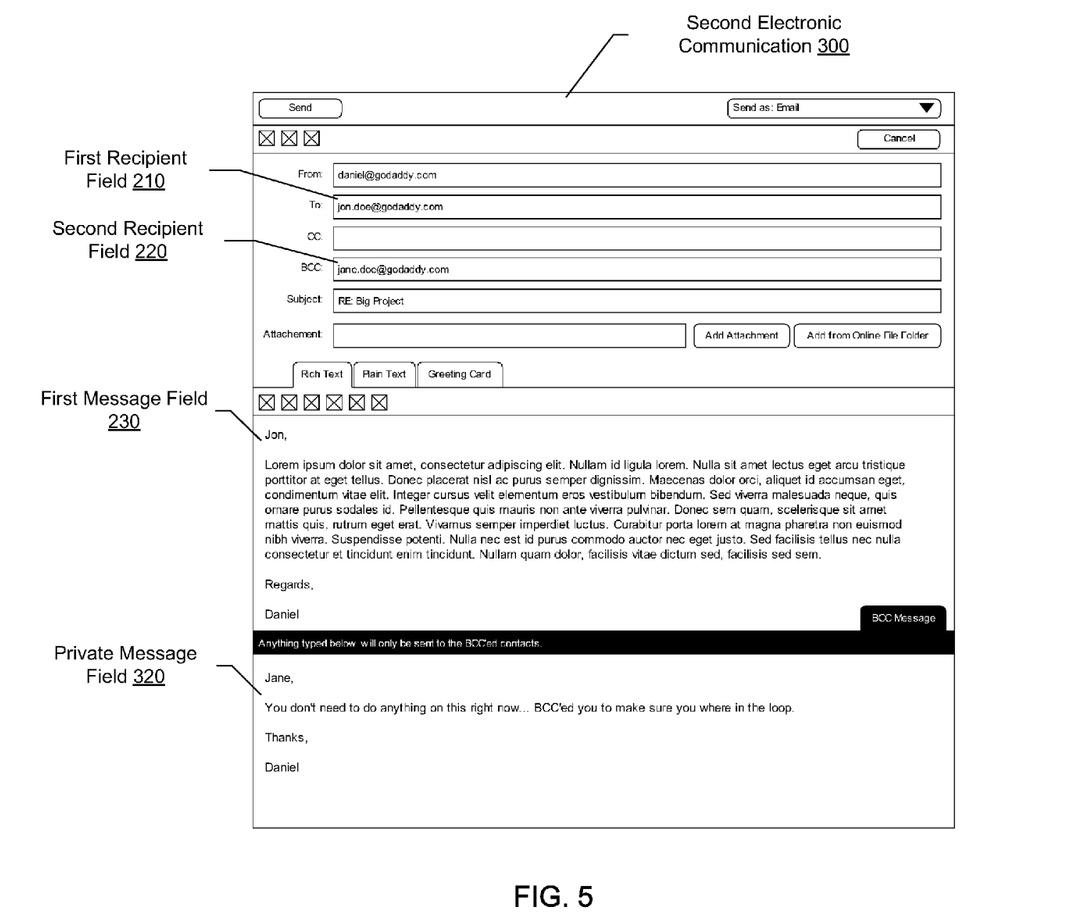
FIG. 5 illustrates a possible embodiment of an electronic communication having a private message field.

However, if the sender 103 enters a second recipient electronic address 250 in the second recipient field 220 (e.g., enters a "BCC:" email address), the sender 103 may be prompted for a private message 310 (illustrated in FIG. 3) for transmission only to the second recipient electronic address 250 (Step 140). The sender 103 may be prompted by any system or method known in the art or developed in the future for prompting a sender for additional information. As illustrated in FIG. 2a, a prompt may comprise a pop-up box rendered in the client computer's 108 browser that displays a prompt substantially similar to: "would you like to send a private message to the BCC recipient" along with "yes" and "no" boxes for the sender 103 to click to enter his response. Alternatively, and as illustrated in FIGS. 4-5, the prompting step (Step 140) may be accomplished by generating and presenting a tab (perhaps labeled "BCC Message"), perhaps somewhere within the first electronic communication 200, that (when clicked) may open a private message field wherein the sender 103 may enter a private message for the second recipient (e.g., BCC email recipient).

If the sender 103 responds negatively to the prompt, a completed version of the first electronic communication 200 (e.g., including the first message 260 entered by the sender 103) may be transmitted to all entered electronic addresses (e.g., first recipient electronic address 240 and/or "To:" or "CC:" email addresses) (Step 130) via any of the message transmission protocols described above.

However, if the sender 103 responds positively to the prompt, a second electronic communication 300 may be generated. A positive response may comprise clicking something similar to the "yes" button of FIG. 2a, clicking the "BCC Message" tab of FIG. 4, or any other response indicating intent or desire to send a private message. A non-limiting example of a second electronic communication 300 is illustrated in FIG. 3 and may comprise the first recipient field 210, the second recipient field 220, the first message field 230, and also a private message field 310, wherein the sender 130 may enter a private message 310 for transmission only to the second recipient electronic address 250.

A private message 310 then may be received from the sender 103 in the private message field 320 (Step 160). As a non-limiting example, the private message 310 may be entered into the private message field 310 on the second electronic communication 300 by the sender 103 typing the messages on his client computer 108. As a non-limiting example, the data may then be received (Step 120) at the server 101 via an HTTP transmission from the client computer's 108 browser.

The two different electronic messages then may be sent to their respective recipients effectuating the above-described private message functionality. For example, a completed version of the first electronic communication 200 (e.g., including the first message 260 entered by the sender 103) may be transmitted to the first recipient electronic address 240 while a completed version of the second electronic communication 300 (e.g., including the first message 260 and the private message 310 entered by the sender 103) may be transmitted to the second recipient electronic address 250, perhaps via the electronic message protocols described above.

Figure 6:
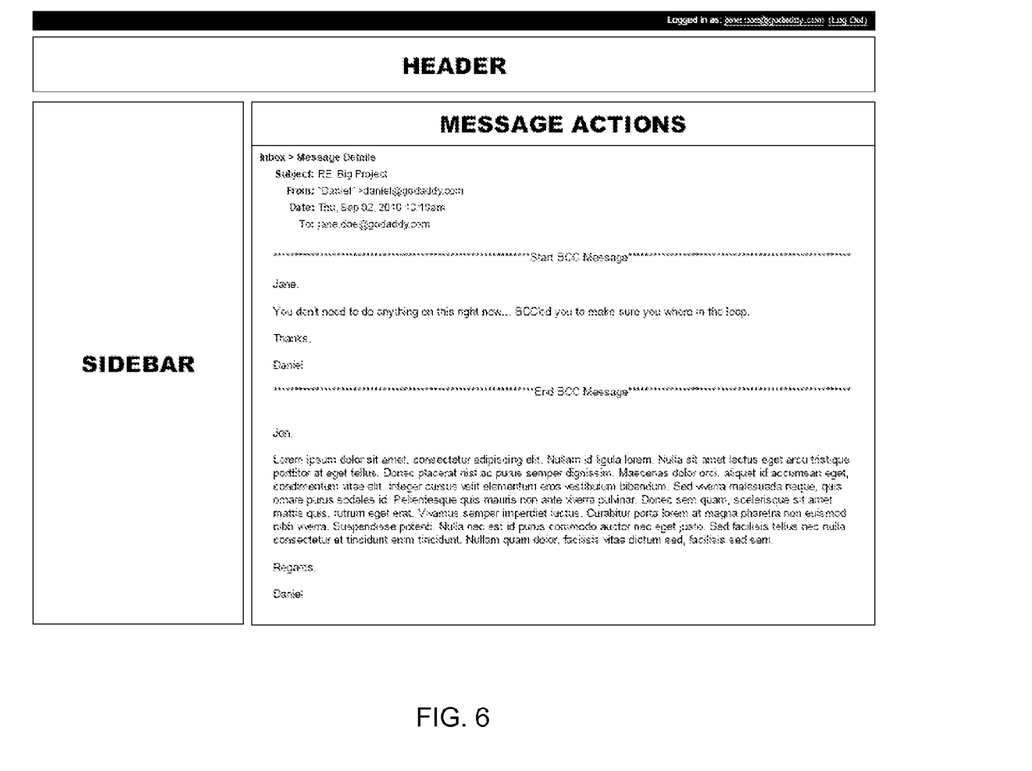
FIG. 6 illustrates a possible embodiment of a received electronic communication having a private message field.

FIGS. 4-6 illustrate example embodiments of an email message implementation of the above-described methods. FIG. 4, for example, illustrates a first electronic communication 200 comprising an email message, wherein the sender 103 ("Daniel" having the email address daniel@godaddy.com) has entered an email address (john.doe@godaddy.com) in the first recipient field 210 (the "To:" field) and another email address (jane.doe@godaddy.com) in the second recipient field 220 (the "BCC:" field) (Step 120). The sender 103 also has entered a message in the first message field 230 (Step 120).

FIG. 5 illustrates a second electronic communication 200 comprising an email message having a private message field 320 that may have been generated (Step 150) responsive to the sender 103 clicking on the "BCC Message" tab to indicate his intent to send a private message to the jane.doe@godaddy.com. In this illustrated embodiment, the sender 103 has entered a message in the private message field 320 that will be received (Step 160) and transmitted only to jane.doe@godaddy.com, the second recipient electronic address 250 (Step 180). FIG. 6 illustrates an example embodiment of how the completed second electronic communication 300 (here an email message) may look when received and viewed, perhaps in a browser on a client computer 108, by jane.doe@goddady.com.

Figure 7:
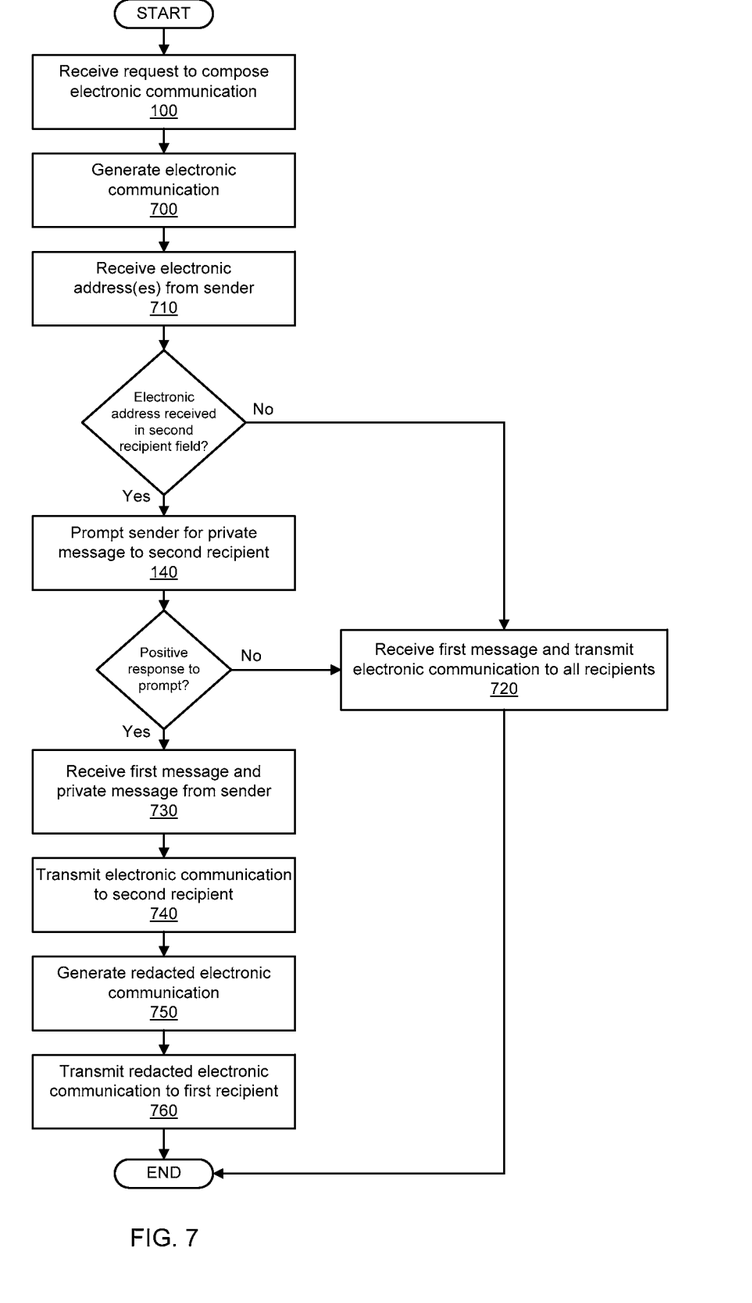
FIG. 7 is a flow diagram illustrating a possible embodiment of a method of private messaging a second recipient of an electronic communication.

FIG. 7 illustrates an alternate example embodiment of a method of private messaging a second recipient of an electronic communication, wherein the first message 260 and the private message 310 may be received after the prompting step (Step 140), an electronic message having both the first message 250 and the private message 310 may be generated and transmitted to the second recipient electronic address 250, and a redacted version of the electronic message (excluding the private message 310) may be generated and sent to the first recipient electronic address 240.

Figure 8:
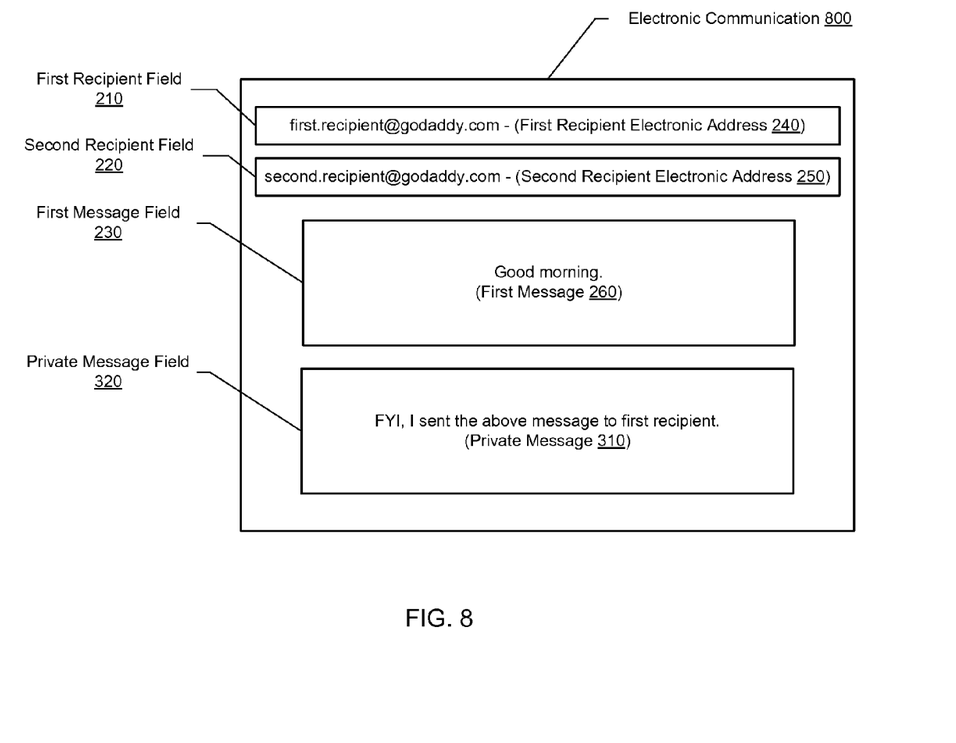
FIG. 8 illustrates a possible embodiment of an electronic communication having a private message field.

This illustrated embodiment may comprise the steps of receiving a request to compose an electronic communication from a sender 103 (Step 100) and generating an electronic communication comprising a first recipient field 210, a second recipient field 220, a first message field 230, and a private message field 320 (Step 700). FIG. 8 illustrates an example embodiment of such an electronic communication 800.

Returning to FIG. 7, the illustrated embodiment may further comprise receiving (perhaps from the sender 103) a first recipient electronic address 240 in the first recipient field 210 and a second recipient electronic address 250 in the second recipient field 220 (Step 710); and, perhaps upon receiving the second recipient electronic address 250 in the second recipient field 220, prompting the sender 103 for a private message 310 for transmission only to the second recipient electronic address 250 (Step 140).

If a negative response to the prompting step (Step 140) is received from the sender 103, the method may further comprise receiving a first message 260 from the sender 103 and transmitting a completed version of the electronic communication 800 (e.g., including the first message 260 entered by the sender 103) to both the first recipient electronic address 240 and the second recipient electronic address 250 (Step 720).

Figure 9:
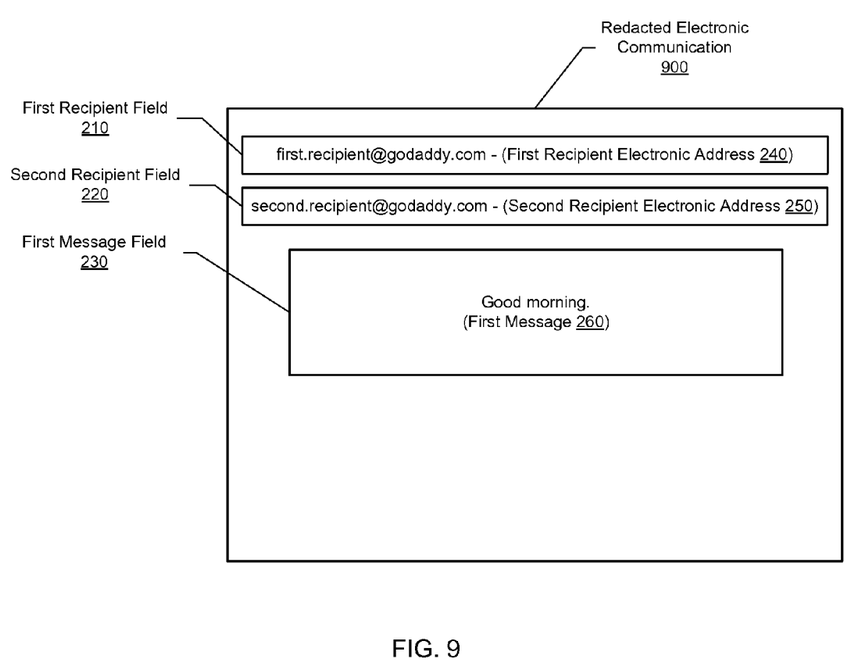
FIG. 9 illustrates a possible embodiment of an electronic communication having a redacted private message field.

Responsive to a positive response from the sender 103 to the prompting step (Step 140), the method may further comprise receiving (from the sender 103) a first message 260 in the first message field 230 and a private message 310 in the private message field 320 (Step 730); transmitting a completed version of the electronic communication 800 (e.g., including the first message 260 and private message 310 entered by the sender 103) to the second recipient electronic address 250 (Step 740); generating a redacted electronic communication 900 (shown in FIG. 9) by redacting the private message 310 and/or the private message field 320 from the electronic communication 800 (Step 750); and transmitting the redacted electronic communication 900 to the first recipient electronic address 240 (Step 760).

Steps 100 and 140 of the method illustrated in FIG. 7 may be accomplished as described above. The generating, receiving, and transmitting steps 700-760 may be accomplished as described above with respect to generating, receiving, and transmitting steps 100-180, only with the described differences as to the data being generated received, and transmitted.

Figure 10:
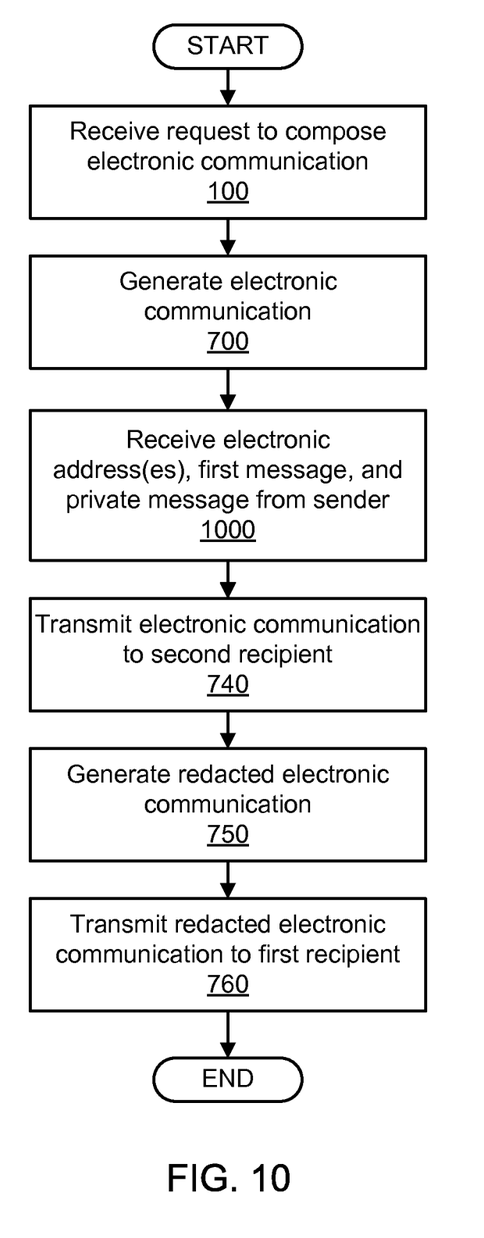
FIG. 10 is a flow diagram illustrating a possible embodiment of a method of private messaging a second recipient of an electronic communication.

FIG. 10 illustrates an alternate example embodiment of a method of private messaging a second recipient of an electronic communication that does not require a prompting step or decision block. This illustrated embodiment may comprise receiving (from a sender 103) a request to compose an electronic communication (Step 100); generating an electronic communication 800 comprising a first recipient field 210, a second recipient field 220, a first message field 230, and a private message field 320 (Step 700); receiving (from the sender 103 as described above in relation to other receiving steps) a first recipient electronic address 240 in the first recipient field 210, a second recipient electronic address 250 in the second recipient field 220, a first message 260 in the first message field 230, and a private message 310 in the private message field 320 (Step 1000); transmitting a completed version of the electronic communication 800 (e.g., including the first message 260 and the private message 310 entered by the sender 103) to the second recipient electronic address (Step 740); generating a redacted electronic communication 900 by redacting the private message 310 and/or the private message field 320 from the completed version of the electronic communication 800 (Step 750); and transmitting the redacted electronic communication 900 to the first recipient electronic address 240 (Step 760).

Figure 11:
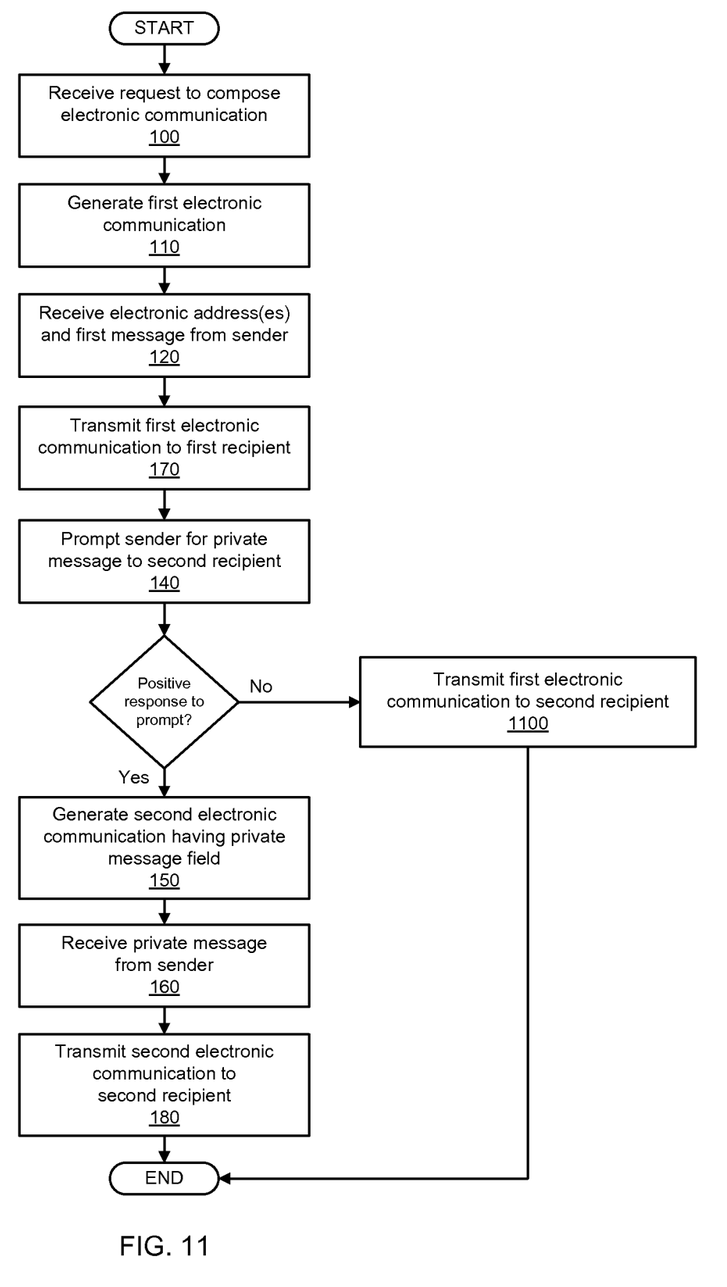
FIG. 11 is a flow diagram illustrating a possible embodiment of a method of private messaging a second recipient of an electronic communication.

FIG. 11 illustrates an alternate example embodiment of a method of private messaging a second recipient of an electronic communication that may comprise receiving (from a sender 103) a request to compose an electronic communication (Step 100); generating a first electronic communication 200 comprising a first recipient field 210, a second recipient field 220, and a first message field 230 (Step 110); receiving (from the sender 103) a first recipient electronic address 240 in the first recipient field 210, a second recipient electronic address 250 in the second recipient field 220, and a first message 260 in the first message field 230 (Step 120); transmitting a completed version of the first electronic communication 200 (e.g., including the first message 260 entered by the sender 103) to the first recipient electronic address 240 (Step 170); and prompting the sender 103 for a private message 310 for transmission only to the second recipient electronic address 250 (Step 140).

If a negative response to the prompting step (Step 140) is received from the sender 103, the method may further comprise transmitting the completed version of the first electronic communication 200 (e.g., including the first message 260 entered by the sender 103) to the second recipient electronic address 250 (Step 1100).

Responsive to a positive response from the sender 103 to the prompting step (Step 140), the illustrated method of FIG. 11 may further comprise generating a second electronic communication 300 comprising the first electronic communication 200 and a private message field 320 (Step 150); receiving (from the sender 103) a private message 310 in the private message field 320 (Step 160); and transmitting a completed version of the second electronic communication 300 (e.g., including the first message 260 and the private message 310 entered by the sender 103) to the second recipient electronic address 250 (Step 180).

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The inventions claimed are:

1. A method, comprising:
   A) receiving from a sender, by at least one server computer communicatively coupled to a network, a request to compose an electronic communication;
   B) generating, by one or more of said at least one server computer, a first email communication comprising a first recipient field, a second recipient field, and a first message field;
   C) receiving from said sender, by one or more of said at least one server computer, a first recipient electronic address in said first recipient field, a second recipient electronic address in said second recipient field, and a first message in said first message field;
   D) responsive to receiving said second recipient electronic address in said second recipient field, prompting, by one or more of said at least one server computer, said sender for a private message for transmission only to said second recipient electronic address;
   E) responsive to a negative response from said sender to said prompting step D), transmitting, by one or more of said at least one server computer, a completed version of said first email communication to said first recipient electronic address and said second recipient electronic address;
   F) responsive to a positive response from said sender to said prompting step D):
      i) generating, by one or more of said at least one server computer, a second email communication comprising said first recipient field, said second recipient field, said first message field, and a private message field that is in addition to said first message field;
      ii) receiving from said sender, by one or more of said at least one server computer, a private message in said private message field after said private message field has been generated;
      iii) transmitting, by one or more of said at least one server computer, said completed version of said first email communication to said first recipient electronic address; and
      iv) transmitting, by one or more of said at least one server computer, a completed version of said second email communication to said second recipient electronic address.

2. The method of claim 1, wherein said first email communication and said second email communication each comprise an email message.

3. The method of claim 2, wherein said first recipient electronic address and said second recipient electronic address each comprise an email address.

4. The method of claim 3, wherein said first recipient field comprises a "To:" field and said second recipient field comprises a "CC:" field.

5. The method of claim 3, wherein said first recipient field comprises a "To:" field and said second recipient field comprises a "BCC:" field.

6. A method, comprising:
   A) receiving from a sender, by at least one server computer communicatively coupled to a network, a request to compose an email communication;
   B) generating, by one or more of said at least one server computer, said email communication comprising a first recipient field, a second recipient field, and a first message field;
   C) receiving from said sender, by one or more of said at least one server computer, a first recipient electronic address in said first recipient field and a second recipient electronic address in said second recipient field;
   D) responsive to receiving said second recipient electronic address in said second recipient field, generating a private message field that is in addition to said first message field and prompting, by one or more of said at least one server computer, said sender for a private message for transmission only to said second recipient electronic address;
   E) receiving from said sender, by one or more of said at least one server computer, a first message in said first message field and a private message in said private message field after said private message field has been generated;
   F) transmitting, by one or more of said at least one server computer, a completed version of said email communication to said second recipient electronic address;
   G) generating, by one or more of said at least one server computer, a redacted email communication by redacting said private message from said completed version of said email communication; and
   H) transmitting, by one or more of said at least one server computer, said redacted email communication to said first recipient electronic address.

7. The method of claim 6, wherein said email communication and said redacted email communication each comprise an email message.

8. The method of claim 7, wherein said first recipient electronic address and said second recipient electronic address each comprise an email address.

9. The method of claim 8, wherein said first recipient field comprises a "To:" field and said second recipient field comprises a "CC:" field.

10. The method of claim 8, wherein said first recipient field comprises a "To:" field and said second recipient field comprises a "BCC:" field.

11. A method, comprising:
A) receiving from a sender, by at least one server computer communicatively coupled to a network, a request to compose an electronic communication;
B) generating, by one or more of said at least one server computer, a first email communication comprising a first recipient field, a second recipient field, and a first message field;
C) receiving from said sender, by one or more of said at least one server computer, a first recipient electronic address in said first recipient field, a second recipient electronic address in said second recipient field, and a first message in said first message field;
D) transmitting, by one or more of said at least one server computer, a completed version of said first email communication to said first recipient electronic address;
E) prompting, by one or more of said at least one server computer, said sender for a private message for transmission only to said second recipient electronic address;
F) responsive to a negative response from said sender to said prompting step E), transmitting said completed version of said first email communication to said second recipient electronic address; and
G) responsive to a positive response from said sender to said prompting step E):
  i) generating, by one or more of said at least one server computer, a second email communication comprising said first email communication and a private message field that is in addition to said first message field;
  ii) receiving from said sender, by one or more of said at least one server computer, a private message in said private message field after said private message field has been generated; and
  iii) transmitting, by one or more of said at least one server computer, a completed version of said second email communication to said second recipient electronic address.

12. The method of claim 11, wherein said first email communication and said second email communication each comprises an email message.

13. The method of claim 12, wherein said first recipient electronic address and said second recipient electronic address each comprise an email address.

14. The method of claim 13, wherein said first recipient field comprises a "To:" field and said second recipient field comprises a "CC:" field.

15. The method of claim 13, wherein said first recipient field comprises a "To:" field and said second recipient field comprises a "BCC:" field.

* * * * *